United States Patent [19]
Matsuo

[11] 3,779,489
[45] Dec. 18, 1973

[54] CONTROLLABLE GLIDING PARACHUTE

[75] Inventor: Jon T. Matsuo, El Centro, Calif.

[73] Assignee: The United States of America as represented by the Secretary of the Navy, Washington, D.C.

[22] Filed: July 31, 1972

[21] Appl. No.: 276,626

[52] U.S. Cl. ............................................ 244/152
[51] Int. Cl. ............................................ B64d 17/34
[58] Field of Search ............... 244/138 R, 142, 145, 244/152

[56] References Cited
UNITED STATES PATENTS

| 2,970,795 | 2/1961 | Gold | 244/152 |
| 3,170,661 | 2/1965 | Basnett | 244/152 |
| 2,993,668 | 7/1961 | Gold | 244/142 |

FOREIGN PATENTS OR APPLICATIONS

| 1,092,378 | 4/1955 | France | 244/152 |

Primary Examiner—Trygve M. Blix
Assistant Examiner—Randolph A. Reese
Attorney—R. S. Sciascia et al.

[57] ABSTRACT

A glidable personnel-type parachute is provided having a conventional canopy and shroud lines connected to a pair of forward and aft risers, a selected number of adjacent shroud lines in the aft risers being releasable by the parachutist simply by pulling on a release lanyard to create a scalloped air-venting portion in the canopy skirt; the release lanyard may also be connected to the shroud lines on each side of the scalloped canopy portion to enable the parachute to be steered in its gliding movement.

6 Claims, 7 Drawing Figures

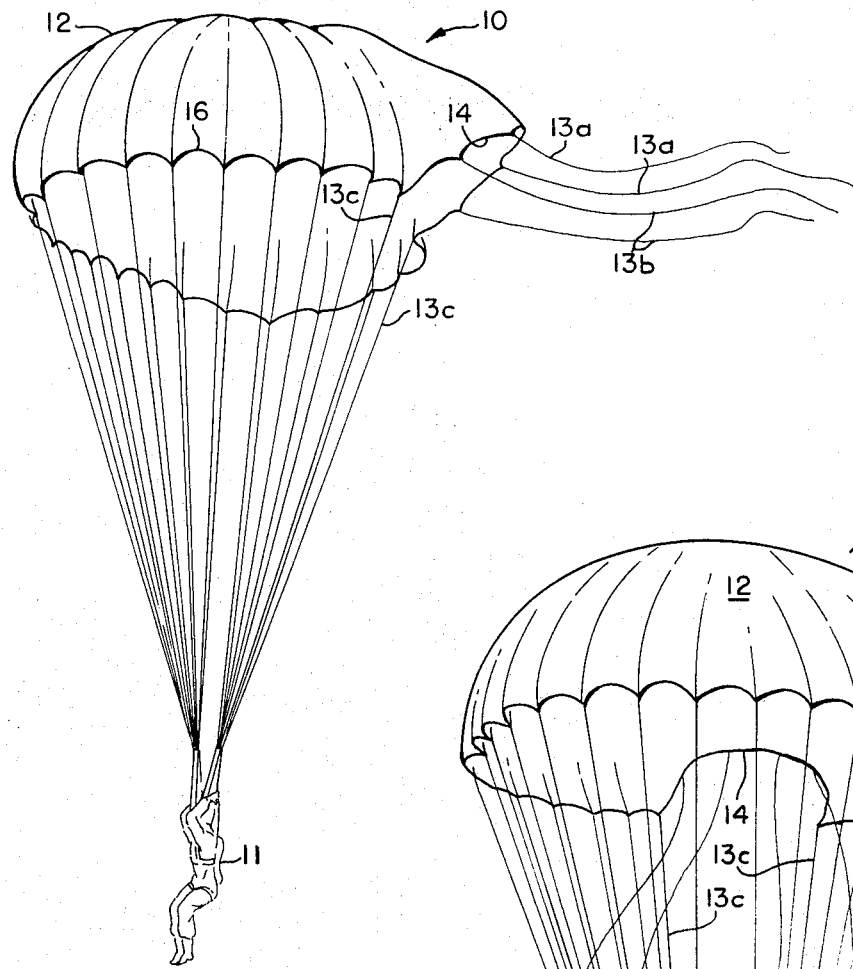
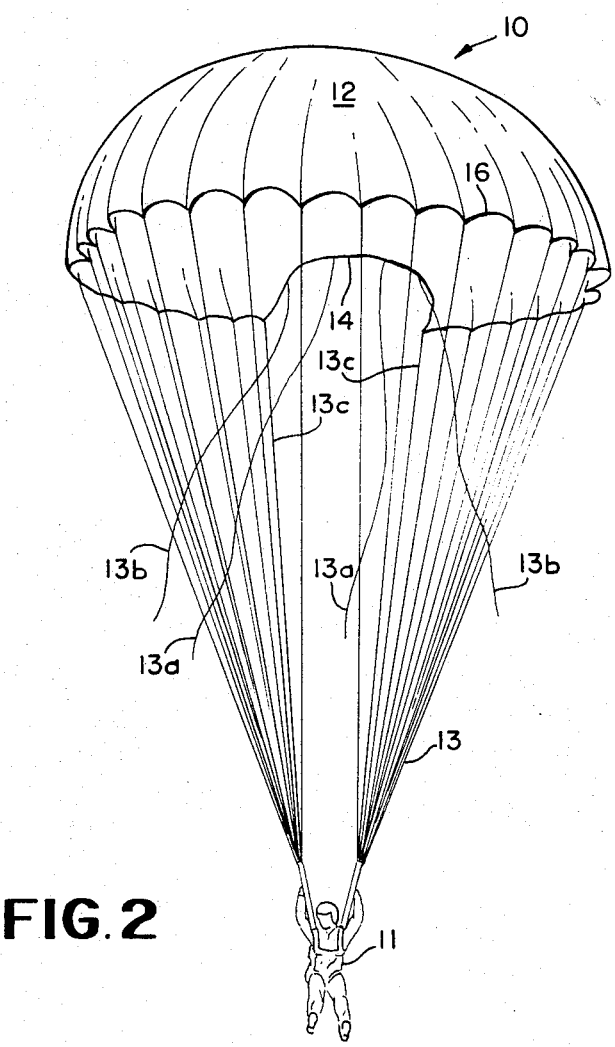
FIG. 1
FIG. 2

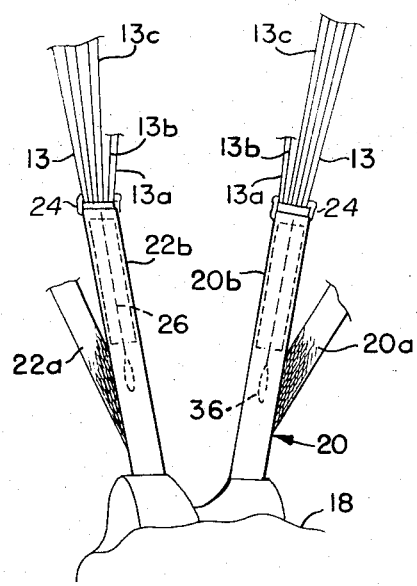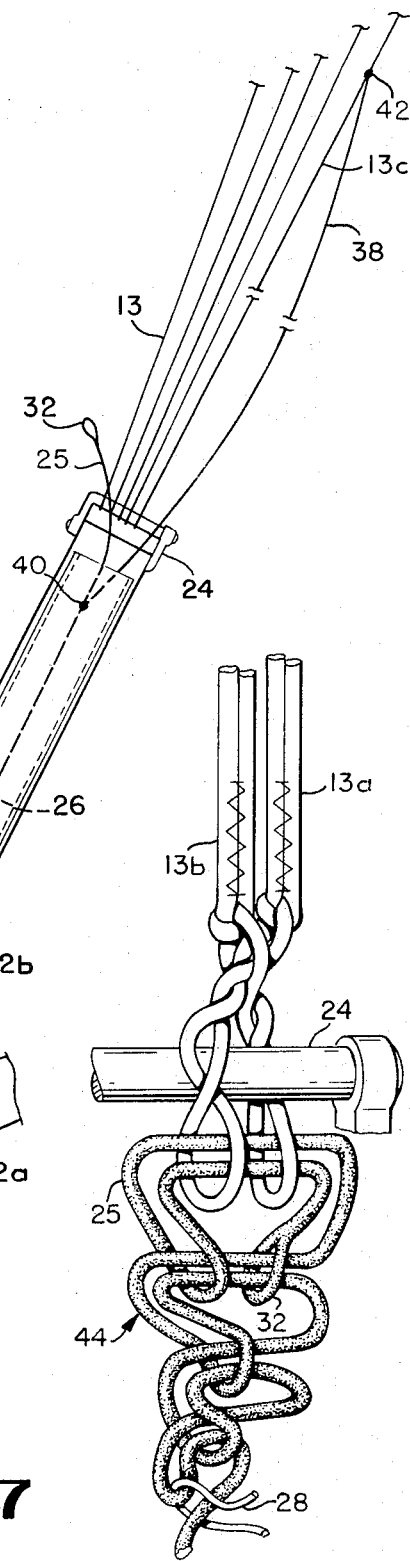
FIG. 3
FIG. 6
FIG. 7

CONTROLLABLE GLIDING PARACHUTE

BACKGROUND OF THE INVENTION

This invention relates to personnel-type parachutes which can be glided and steered but it is understood that it can be used for any purposes for which it is found applicable.

There is an inherent tendency during the normal descent of a deployed parachute, particularly one having a flat-type canopy, to be unstable due to periodic oscillations. a flat-type canopy is one that will lie flat when extended on the ground. Such oscillations can exceed a 45° swing causing severe discomfort and sickness to the user. In addition, an oscillating parachute enhances the likelihood of a more difficult and dangerous landing and increases the accident rate because the escapee is unable to manipulate the risers to reduce the oscillations.

Current military procedures provide for cancelling these oscillations and creating a capability for turning and steering the parachute canopy by the parachutist cutting designated shroud lines in the immediate vacinity of the aft risers. Usually, four adjacent lines were so designated, two in each of the rear risers. The freeing of these shroud lines causes a large lobe or scalloped portion in the canopy for the venting of the captured air under the canopy which provides the parachute with a gliding motion. This procedure requires the parachutist to grip each of the rear risers and pulling it down with one hand to a point where the visually marked area on the designated shroud lines can be reached with the knife held in the other hand, the knife being standard equipment for this purpose. If difficulty is experienced by the parachutist in pulling down the rear risers with one hand, both hands can be employed for this purpose after the knife is suitably stowed.

It has been found that the scalloped canopy modified by the above procedure will inherently cause the parachute to glide at approximately 3 to 4 knots in still air in the direction the parachutist is facing, which gliding movement materially reduces the tendency of the parachute to oscillate. The parachutist can maneuver the gliding parachute toward a suitable landing area by pulling down on either one of the rear risers, steering the parachute in the desired path.

Although the above described procedure provided the parachutist with a better degree of control, there remained several inherent limitations. For example, since a cutting tool is required, the user must exercise careful manipulation of the tool to prevent loss and the judicious selection of the designated shroud lines. If the parachutist is injured such manipulation may not be possible as well as hindering his ability to pull down the risers to reach the designated cutting areas of the shroud lines. Under these conditions, it is also probable that he will not have the strength to pull down on the risers for steering the parachute, which feat at times is difficult even for an uninjured parachutist, especially over prolonged periods of descent. There is also a psychological disadvantage of the above described procedure as the parachutist is required to cut away a part of the parachute system that has saved his life.

Other gliding parachutes have been proposed in the prior art, but these designs require specially configured parachute canopies, or a canopy having slits or extensive modifications making it impossible or too expensive to modify parachutes currently in use.

The capability of modifying the large number of existing parachutes in the inventory of the Armed Forces to obtain the gliding and steering characteristics by remote field activities, i.e., aircraft carriers, without special equipment and facilities is a most important practical and operational consideration.

SUMMARY OF THE INVENTION

In accordance with the teaching of the present invention, an off-the-shelf personnel-type parachute can be modified in a simple and inexpensive manner to possess the capability of being glided and steered by the parachutist during descent. This result is achieved at will by the parachutist without the need for tools; requiring the exertion of a minimum effort by the parachutist; and enabling this task to be achieved even by a parachutist who may be descending in an injured condition. The two adjacent shroud lines in each of the rear riser straps which heretofore were severed by the parachutist with the aid of a knife, are instead secured to the respective riser links by means of a readily releasable connection, i.e., slip knot. The knot may be of the daisy-chain type created by using one end of a release lanyard. The lanyard is temporarily secured in the knotted position to be released by the parachutist at will when the need arises. When the designated shroud lines are released, the corresponding part of the canopy skirt assumes a scalloped, air-venting condition to create reaction forces that provide the parachute with the desired glide movement.

If desired the invention may also provide a simple and practically effortless means of steering a parachute, as compared with the prior art method of gripping and pulling down each of the entire aft risers with the four remaining shroud lines still attached. This modification is achieved by adding an extension line to the end of each release lanyard, and attaching the upper end of each extension line to the shroud line in each rear riser immediately adjacent each pair of jettisonable shroud lines. Each extension is attached to the respective shroud approximately 5 feet up from the shroud's attachment point to the riser link. These shroud lines may be called "control shrouds" since they are connected to the canopy skirt immediately adjacent and on both sides of the scalloped air-venting portion of the canopy skirt formed by the jettisoned shroud lines. It should be apparent that a pull on either of the control shroud lines through its respective lanyards will effectively modify the configuration of the scalloped vent opening correspondingly to change the forward reaction force on the parachute and its direction of movement.

STATEMENT OF THE OBJECTS OF INVENTION

An important object of this invention is to provide a personnel-type parachute which during descent can be glided and steered at will, and with a minimum effort required on behalf of the parachutist.

Another important object of this invention is to provide such a parachute in which the aforementioned characteristics can be obtained by modifying existing off-the-shelf parachutes in a simple and inexpensive manner.

Still another object is to provide such a parachute capable of being modified without special equipement by personnel at advanced bases or on board ships carrying a parachute inventory.

Other objects, advantages and novel features of the invention will become apparent from the following detailed description of the invention when considered in conjunction with the accompanying drawings.

BRIEF DESCRIPTION OF THE DRAWINGS

FIGS. 1 and 2 are side and front elevation views, respectively, of a deployed descending parachute in a gliding orientation through the employment of the present invention.

FIG. 3 is a rear elevation view of the upper portion of the parachute harness showing the arrangement of the front and rear pairs of risers.

FIG. 6 is a front elevation view of one pair of front and rear risers after the shroud lines have been jettisoned and generally showing the general arrangement of the modified release lanyard for steering the parachute.

FIG. 7 is a modified slip knot for securing the releasable shroud lines, similar to FIG. 5, for the steering arrangement of FIG. 6.

DESCRIPTION OF THE PREFERRED EMBODIMENTS

Figure 4:
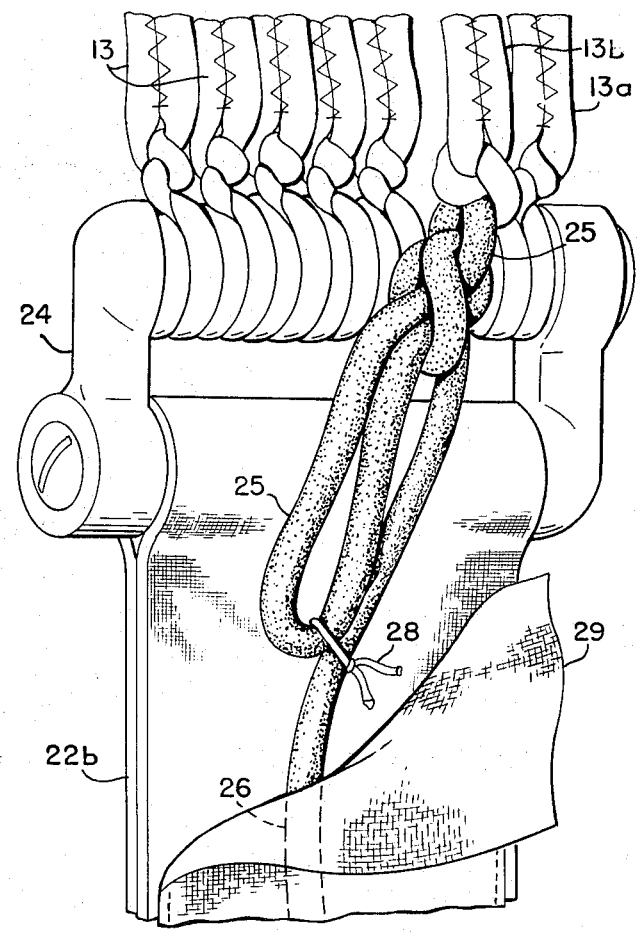
FIG. 4 is an enlarged view of the one of the rear riser links with the riser flute partially peeled back to show the release lanyard temporarily tacked in position.

Referring to the drawings where like reference numerals refer to similar parts throughout the figures, there is illustrated in FIGS. 1 and 2 a novel personnel-type parachute 10 deployed to carry a parachutist 11 in a gliding orientation. The gliding condition of the canopy 12 is achieved by the present invention through the release of four, more or less, of the aft suspension or shroud lines 13 shown in FIGS. 1 and 2 streaming in a trailing condition, forming a lobe or scalloped area 14 in the canopy skirt 16. The inventive manner by which the designated shroud lines are released will be described presently.

Scalloped area 14 functions to exhaust a portion of the air captured under the canopy in a rearward jet stream, providing an opposite and forward reaction force that produces a corresponding forward gliding movement of the parachute. Such an arrangement can provide the parachute with a forward speed of from 3 to 4 knots. It has been found that a flat-type canopy has a tendency to oscillate up to 45 degrees during descent. Such instability can cause severe discomfort to the user, and in addition, make his landing more dangerous. It has been found that the above-described gliding movement of the parachute will cancel out such oscillations, and materially reduce the landing accident rate.

In addition to the novel means for obtaining a gliding movement of the parachute, the invention proposes a modified means for steering the gliding parachute in a manner later to be described.

As is shown in FIG. 3, parachute harness 18 is normally connected to the lower ends of shroud lines 13 through a pair of right and left hand riser straps 20 and 22, each pair having a front and rear strap riser designated as "a" and "b," respectively. One-fourth of the total number of shroud lines are secured by each riser strap through a riser connector link 24, seven shroud lines being illustrated, although the number of shroud lines may vary with different canopy sizes.

As previously described, the standard practice promulgated by the U. S. Navy for establishing a gliding parachute is for the parachutist to cut with a knife, the two inboard shroud lines of each rear riser strap marked as 13a and 13b in FIG. 3 to create the gliding condition of the parachute illustrated in FIGS. 1 and 2.

Figure 5:
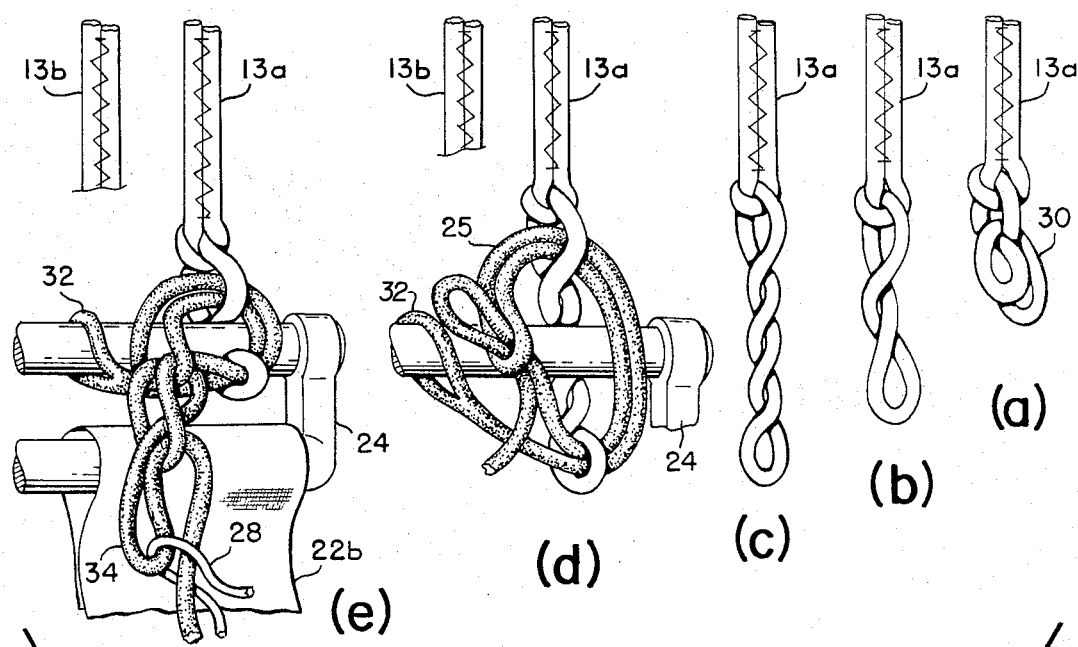
FIG. 5 depicts the sequential step-by-step procedure of securing the two releasable shroud lines to each rear riser link by the formation of a daisy chain knot with one end of the release lanyard.

The novel manner of releasably securing the preselected, rear shroud liners to the riser links 24 is illustrated in FIGS. 4 and 5, where only the left rear riser link is shown for this purpose. FIG. 4 shows the completed left rear riser strap 22b which has been modified by releasably knotting together shroud lines 13a and 13b to the link 24 by an upper end 25 of release lanyard 26 shown tacked temporarily in position by a breakable tacking line 28. A flute webbing 29 forming a protective passageway for lanyard 26 is sewn along its edges to the riser strap 22, and is shown in FIG. 4 partially peeled back to show tacking line 28.

The step-by-step procedure for releasably knotting shroud lines 13a and 13b is shown in FIG. 5, where for the sake of simplicity only one shroud line 13a is illustrated in the knotting operation, although in actual practice both lines 13a and 13b will be connected in the same operation. Step (a) shows shroud line 13a in its originally installed condition as the knotted end 30 is slipped off the link 24. It should be noted that the five remaining shroud lines 13 on the left hand in FIG. 4 not modified by this invention are connected to the riser link in this same manner. Knot 30 is first unravelled, and by steps (b) and (c) the straightened end is twisted twice. In step (d) an eye 32 at the end of release lanyard 25 is first anchored to riser link 24, and a looped intermediate portion of the lanyard end 25 is reeved through the twisted ends of the shroud 13a as shown to form the first daisy-chain. The daisy-chain is a type of slip knot well known in the parachute art. In step (e) a second daisy-chain is formed with lanyard end 25 and bight 34 in the manner shown, and the bight is temporarily secured to riser strap 22b by tacking line 28. The knotted connection of lanyard end 25 will retain its integrity to secure releasable lines 13a and 13b to connector link 24 as long as tacking line 28 remeains unbroken.

When the parachutist has decided to glide his parachute he need only rear rearwardly to the rear riser straps, grasp each of handles 36 (FIG. 3) of the release lanyards with one hand and tug sharply to break the respective tacking line 28. Lanyard 26 and handle 36 may be dyed a different color from the harness, i.e., red so that the parachutist can determine by a glance that his parachute has the invention device incorporated therein. This action frees shroud lines 13a and 13b from the respective connector link which unravel by the applied tension and are jettisoned providing the condition in FIGS. 1 and 2.

The parachutists decision to glide his parachute depends on several considerations as set forth by prescribed U. S. Navy doctrine. The principle purpose of gliding the parachute is to cancel out severe oscillations and to enable the parachute to be steered in a desired direction. Gliding the parachute should only be performed during daylight hours since it increases lateral speed, and if the user is not able to see the terrain any increase in speed may enhance the opportunity of being injured during landing. In addition, the parachutist should be able visually to inspect his parachute to see that the shroud lines or canopy have not been damaged during ejection and opening before jettisoning the severable shroud lines, such operations being difficult in the dark. It has been found in practice always desirable to create a gliding parachute over water because upon the parachute's initial contact with the water, the shroud lines will be fully stretched out in front of him thus minimizing the possibility that the parachutist will become entangled with the lines or the canopy draped over his head.

With the parachute in a gliding condition, the parachutist can perform the steering operation in the conventional manner as heretofore described, namely, by grasping either of the rear riser straps and hauling down on the five remaining shroud lines connected to each of the respective rear connector links.

However, another important object of the invention, as illustrated in FIG. 6 and 7, is to reduce the effort heretofore required by the parachutist in steering a gliding parachute, and to provide a greater degree of steering control. These results can be obtained by the optional provision of attaching an extension 38 to release lanyard 26. The lower end of extension 38 is integrally connected, i.e., by splicing at 40, to the lanyard end 25 with the upper end of lanyard extension 38 spliced to shroud line 13c at 42, approximately five feet distant from attaching point 40. It will be noted in FIG. 2 that each rear shroud line 13c is immediately adjacent the released shroud lines 13a and 13b and connected to the canopy on each side of scalloped area 14.

In operation, after lanyard 26 has been yanked by the parachutist at handle 36 by the parachutist to release shroud lines 13a and 13b causing the parachute to glide, the parachute may be steered simply by further pulling down on handle 36 of FIG. 6. Such a pulling action causes the respective shroud line 13c to modify the scalloped area 14 and achieve a desired change in course of the gliding parachute. It has been found with this steering modification, control can be exercised by parachutist pulling down on only one shroud line with a single finger, compared to the prior method of hauling down all five remaining shroud lines in each rear riser. In addition, the 5 foot lanyard extension allows a more extensive vertical movement compared with the prior art method. In order fully to utilize the release lanyard extension 38 as a means for steering the gliding parachute, the method of releasably knotting the shroud lines 13a and 13b as shown in FIGS. 4 and 5 should be modified by disconnecting each lanyard eye 32 from its corresponding connector link 24. This allows release lanyard end 25 to be free of the link 24 when the daisy-chain knot is unravelled, enable release lanyard 26 unrestricted downward movement to the extent of its length, i.e., 5 feet for the steering manuever. In FIG. 7 is shown the final step of such a modified knotting procedure to enable lanyard 26 to be used for the steering operation. The knotting procedure in FIG. 7 is similar to that shown in FIG. 5, and is self explanatory. The principal difference to be noted is that lanyard eye 32 in FIG. 7 forms a part of the daisy chain knot 44, rather than being anchored to the connector link as in FIG. 5. Accordingly, when tacking line 28 is broken by a yank on release lanyard 26, the daisy knot 44 is completely unravelled with lanyard eye 32 being completely disconnected from its respective link 24.

The present invention affords a more simply and expedient means for enabling a parachutist to glide his parachute during descent following the official U. S. Navy doctrine. The advantages over the prior art technique of cutting the released shroud lines with a knife is several fold. From a psychological consideration, omission of the knife-cutting operation improves morale as the parachutist is not required to cut away a part of the parachute system that has saved his life, even though the same result is achieved. Another important advantage is that employment of the invention does not require specially fabricated parachutes, and therefore off-the-shelf parachutes can be modified by personnel at any facility without the need for special tools. Improved steering capabilities can be realized by the adding of the steering extension to the release lanyard which will provide better steering control of the parachute with much less effort required by the parachutist.

Obviously many modifications and variations of the present invention are possible in the light of the above teachings. It is therefore to be understood that within the scope of the appended claims the invention may be practiced otherwise than as specifically described.

It is claimed:

1. A glidable personnel-type parachute apparatus comprising:
   a canopy having a continuous peripheral skirt;
   a plurality of shroud lines connected at their upper ends to spaced points around said canopy skirt;
   said shroud lines divided into a plurality of groups, the shroud lines in each group connected at their lower ends to forward and aft riser straps;
   a selected number of adjacent shroud lines on one side only of the canopy in at least two of said riser straps being releasably connected to their respective riser straps to form when released a scalloped air-venting portion in the canopy skirt to glide the parachute;
   means accessible to the parachutist for releasing said selected shroud lines from each of the respective risers by a simple pull action by the parachutist without the need for a cutting tool.

2. The parachute of claim 1 wherein said selected shroud lines are connected to each of the respective riser links by means of a releasable slip knot.

3. The parachute of claim 2 wherein said slip knot is temporarily secured in position by a breakable tacking means.

4. The parachute of claim 2 wherein said slip knot is formed by one end of a lanyard in a daisy-chain configuration and is secured from unravelling by a tacking breakable by a sharp tugging force exerted by the parachutist.

5. The parachute of claim 4 wherein said lanyard extends longitudinally along the riser and is provided with a handle gripping means for the parachutist.

6. A glidable personnel-type parachute apparatus comprising:
   a canopy having a continuous peripheral skirt;
   a plurality of shroud lines connected at their upper ends to spaced points around said canopy skirt;
   said shroud lines divided into a plurality of groups, the shroud lines in each group connected at their lower ends to forward and aft riser straps;
   a selected number of adjacent shroud lines on one side only of the canopy in at least two of said riser straps being releasably connected to their respective riser straps to form when released a scalloped air-venting portion in the canopy skirt to glide the parachute;

means accessible to the parachutist for releasing said selected shroud lines from each of the respective risers by a simple pull action by the parachutist without the need for a cutting tool;

steering control means for manually controlling the unreleased shroud lines immediately adjacent both sides of the scalloped portion in the canopy skirt to vary the aerodynamic configuration of the scalloped portion;

said control means comprising a lanyard having an end portion for releasing the selected shroud line and an extension for connection to an unreleased shroud line immediately adjacent the scalloped portion of the canopy skirt, whereby an initial tug on the lanyard will first release the selected shroud line and thereafter manipulation of the lanyard will control the direction of the parachute glide path.

* * * * *